US008246008B2

(12) United States Patent
De Jong et al.

(10) Patent No.: US 8,246,008 B2
(45) Date of Patent: Aug. 21, 2012

(54) LIFTING SYSTEM

(75) Inventors: Jurjen Jan De Jong, Buitenpost (NL); Wybe Jan Thymen Laverman, Beetgum (NL)

(73) Assignee: Stertil B.V., Kootstertille (NL)

( * ) Notice: Subject to any disclaimer, the term of this patent is extended or adjusted under 35 U.S.C. 154(b) by 861 days.

(21) Appl. No.: 12/226,909

(22) PCT Filed: May 1, 2007

(86) PCT No.: PCT/NL2007/000115

§ 371 (c)(1),
(2), (4) Date: Feb. 13, 2009

(87) PCT Pub. No.: WO2007/126310

PCT Pub. Date: Nov. 8, 2007

(65) Prior Publication Data

US 2009/0173923 A1 Jul. 9, 2009

(30) Foreign Application Priority Data

May 3, 2006 (NL) ..................................... 1031744

(51) Int. Cl.

| | |
|---|---|
| ***B62B 3/06*** | (2006.01) |
| ***B66F 5/02*** | (2006.01) |
| ***B66F 5/04*** | (2006.01) |
| ***B66F 9/00*** | (2006.01) |
| ***B66F 3/24*** | (2006.01) |
| ***B66F 7/02*** | (2006.01) |
| ***B66F 5/00*** | (2006.01) |
| ***B60P 1/64*** | (2006.01) |
| ***B60P 1/14*** | (2006.01) |
| ***B60P 1/22*** | (2006.01) |
| ***B60P 1/10*** | (2006.01) |
| ***B60P 1/48*** | (2006.01) |
| ***H02P 9/00*** | (2006.01) |
| ***H02P 11/00*** | (2006.01) |
| ***H02P 7/06*** | (2006.01) |

(52) U.S. Cl. ......... 254/2 C; 254/2 B; 254/4 B; 254/7 B; 254/9 B; 254/2 R; 322/44; 322/24

(58) Field of Classification Search .................. 254/2 B, 254/2 C, 4 B, 7 B, 9 B, 2 R; 322/44, 24
See application file for complete search history.

(56) References Cited

U.S. PATENT DOCUMENTS 3,512,072 A * 5/1970 Arvin et al. .................. 320/127
(Continued)

FOREIGN PATENT DOCUMENTS

EP 0 314 660 5/1989
(Continued)

*Primary Examiner* — Monica Carter
*Assistant Examiner* — Seahee Yoon
(74) *Attorney, Agent, or Firm* — Harness, Dickey & Pierce, P.L.C.

(57) ABSTRACT

System for lifting and lowering a load, such as a vehicle, with at least one lifting mechanism such as a lifting column, a boom lift, a scissor lift and a loading platform. The lifting mechanism includes a carrier which can be moved up and downward for bearing the load and a drive which acts on the carrier. The drive herein includes at least one electrical power source and an electric motor to be energized at least during ascending of the carrier, and the electric motor forms a generator to be connected to the power source at least during even an unloaded descending movement of the carrier for the purpose of gene rating electrical energy to the power source.

8 Claims, 4 Drawing Sheets

U.S. PATENT DOCUMENTS

| | | | | |
|---|---|---|---|---|
| 4,723,107 | A * | 2/1988 | Schmid | 322/35 |
| 4,961,316 | A * | 10/1990 | Corke et al. | 60/431 |
| 5,649,422 | A * | 7/1997 | Baginski et al. | 60/431 |
| 6,315,079 | B1 * | 11/2001 | Berends et al. | 187/210 |
| 6,460,332 | B1 * | 10/2002 | Maruta et al. | 60/414 |
| 6,634,461 | B1 * | 10/2003 | Baker | 187/247 |
| 2005/0235638 | A1 * | 10/2005 | Segerljung | 60/445 |
| 2006/0115353 | A1 * | 6/2006 | Berends et al. | 414/458 |
| 2006/0233633 | A1 * | 10/2006 | Passeri | 414/631 |

FOREIGN PATENT DOCUMENTS

| | | |
|---|---|---|
| EP | 0 376 206 | 7/1990 |
| EP | 0 560 089 | 9/1993 |
| EP | 0 566 195 | 10/1993 |
| EP | 0 908 413 | 4/1999 |
| EP | 1 852 388 | 11/2007 |
| GB | 1 576 435 | 10/1980 |
| JP | 2-179202 | 7/1990 |
| NL | 1027870 | 6/2006 |

* cited by examiner

LIFTING SYSTEM

This application is the national phase under 35 U.S.C. §371 of PCT/NL2007/000115, which has an International filing date of filed on May 1, 2007, which designated the United States of America, and which claims priority to NL 1031744, filed on May 3, 2006, the entire contents of each of which are hereby incorporated herein by reference.

The present invention relates to a system for lifting and lowering a load, such as a vehicle, with at least one lifting mechanism such as a lifting column, a boom lift, a scissor lift and a loading platform, which lifting mechanism comprises:

a carrier which can be moved up and downward for bearing the load; and a drive which acts on the carrier.

Such a system can be particularly intended as a lift for such vehicles, which can thereby be lifted off the ground for inspection or maintenance on the underside of the vehicles. The system preferably comprises at least one lifting column, which lifting column comprises: a frame; a carrier which can be moved up and downward along the frame for bearing the load; and a drive between the frame and the carrier. It is usual in the art for hydraulic systems to be used here as drive, although within the scope of the present invention it is also possible to make use of wholly electrical systems, etc.

In such systems it is desired to limit the amount of cables and cabling to a minimum, particularly when the lifting column is a mobile lifting column which can be transported to the location where it is to be used. For this purpose the lifting column can for instance be provided with swivel wheels, etc. In such an application, and particularly taking account of the objectives, it is desirable to use batteries. The use of a battery in a lifting column is a per se known measure. It is the case here however that the present invention is not limited to systems with lifting columns with batteries therein. The problem which the present invention aims to address is however related to the use of autonomous power sources such as batteries in combination with lifting columns, for instance in a system wherein the autonomous nature of such power sources entails that they have a limited lifespan.

In such (mobile) lifting columns the lifespan, durability or practicability of such a power source is limited. The present invention has for its object to improve the lifespan, usability or practicability of such power sources. A system according to the present invention is distinguished for this purpose by the measures that the drive comprises at least one electrical power source and an electric motor to be energized at least during ascending of the carrier, and that the electric motor forms a generator to be connected to the power source at least during even an unloaded descending movement of the carrier for the purpose of generating electrical energy to the power source.

In the case that use is made of a battery as power source, it can be at least partly recharged with electrical energy from the generator. However, even if the lifting column in the system according to the present invention is connected to the mains supply, the electric motor can feed electrical energy back to this mains supply. The total energy consumption of the system can thus be reduced. However, the invention can be applied particularly, though not exclusively, in the case of systems with a lifting column and a rechargeable power source which can run down in the course of time.

The invention achieves that a considerably improved energy management of the system according to the invention can be realized.

Preferred embodiments are defined in the various dependent claims. These relate substantially to the ways in which the electric motor can be driven and/or coupled to the power source (NEN) in a descending operative mode.

The power source can thus comprise a direct current source, such as at least one battery, and a selective polarity-inverting circuit can be arranged between the power source and the generator. In such an embodiment it is the case that rotation of the drive shaft, inherently present in an electric motor, during a downward movement of the carrier in an opposite direction relative to that during an upward movement can be converted into an energy to be generated by the electric motor in a polarity corresponding with that of the power source. The power source, in particular a battery, can thus be safely charged with electrical energy generated by the electric motor, or rather the generator. The selective polarity-inverting circuit can herein be adapted to invert the polarity of the connection between the power source and the electric motor at a change-over between upward and downward movements of the carrier. In such an embodiment it is the case that the polarities are inverted with certainty when the carrier begins a downward movement, so there is no way that damage can be caused to the power sources, which could in determined embodiments result in damage to the batteries or the other forms of power source.

In a preferred embodiment the system according to the invention has the feature that the power source comprises at least two sub-sources such as direct current sources, such as batteries. A higher voltage can thus be provided to the electric motor with the separate sub-sources in combination, and this can be an electric motor of a higher power. Heavier tasks can thus be performed. Measures will otherwise usually also be taken particularly to prevent uncontrolled descent of the carrier along the frame. Such measures are generally known and reference is made only by way of example to a system comprising a tilting plate and protrusions as according to for instance EP 0 566.195.

In an embodiment with a number of sub-sources the measure can favourably be applied that the sub-sources are connected to the generator via a serial-parallel circuit, and that the serial-parallel circuit connects the sub-sources in series during an upward movement of the carrier and connects the sub-sources in parallel during a downward movement. The following can thus be realized. If the intended descent speed of the carrier, with or without a load thereon, is the same speed as the ascent speed but in opposite direction, the same rotation speed of the electric motor will then be created by the downward movement. It is however known that—in order to enable an electric motor to function effectively as a generator—a rotation speed must be created therein which shows a relation between the unloaded and loaded rotation speeds. It is particularly the case that the motor must then be driven to a rotation speed above the unloaded rotation speed up to substantially (though not exclusively) a maximum rotation speed equal to the unloaded rotation speed plus the difference between the loaded and the unloaded rotation speed. It is also the case that the rotation speed of the motor generator must be proportional to the battery voltage in an embodiment in which a battery is used. By thus providing a number of sub-sources and connecting these in parallel to the electric motor functioning as generator, an induced rotation speed can be created in the electric motor during the descending movement at substantially the same rotation speed as during the ascending movement, wherein the sub-sources connected in parallel can be effectively charged.

In a further embodiment a system according to the present invention can have the feature that the drive further comprises: a hydraulic pump coupled to the electric motor and a hydraulic motor, such as a cylinder, connected to the pump. It can be favourable here if the hydraulic pump is reversible. That is, the hydraulic pump is suitable to allow passage of a flow of hydraulic fluid in the direction opposite to that in which the fluid would flow during ascending of the carrier in order to move the carrier upward. The electric motor is then also set into movement, in particular the drive shaft thereof, be it in an opposite direction during a descending movement relative to the ascending movement. A polarity-inverting circuit can be particularly useful here between the power source or sub-sources and the electric motor functioning as generator. As addition or as alternative, it can be possible to accommodate the hydraulic pump in a conduit system with valves and conduits such that the flow of hydraulic fluid also flows or streams in the same direction through the hydraulic pump during a descending movement of the carrier as in the case of an ascending movement. This can be realized in elegant and effective manner with a hydraulic system, whereby simpler hydraulic pumps can be applied according to the present invention. In such an embodiment it is further possible for the hydraulic circuit to be adapted to reverse the flow direction of hydraulic fluid during change-over between upward and downward movements of the carrier. It is thus possible, with certainty, to prevent flows of hydraulic fluid running in a direction which is undesired at a determined moment in time (during the ascending movement or during the descending movement).

The present invention will be further elucidated hereinbelow on the basis of a number of exemplary embodiments which are shown in the accompanying drawings, wherein the same reference numerals are used for the same or similar components and elements, and in which.

Figure 6:
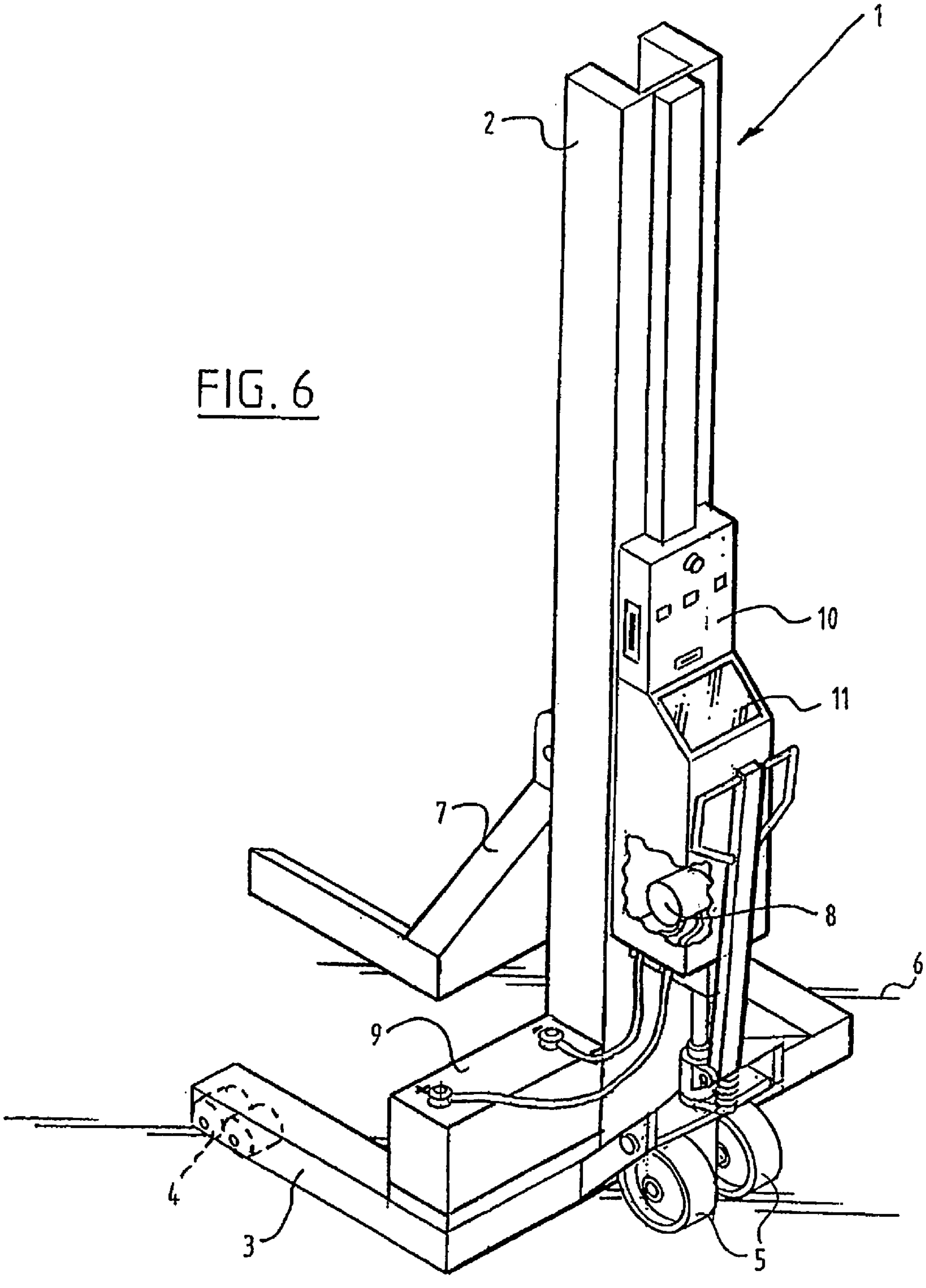
FIG. 6 is a perspective view of a mobile lifting column as embodiment of a system according to the present invention.

The lifting column 1 as shown in FIG. 6 as possible embodiment of a lifting mechanism comprises a mast 2 which protrudes above a foot 3 which can travel on running wheels 4, 5 over a ground surface 6, for instance a floor of a garage. A carrier 7 is movable up and downward along the mast. The mast forms a guide for the movement of the carrier. For this purpose a motor 8 is powered with electrical energy from a power source formed as battery 9. Motor 8 is an electric motor which acts in usual manner on a hydraulic cylinder (not shown in FIG. 6) but which can also act directly on carrier 7, for instance via a spindle shaft (not shown) or in other manner.

A control panel 10 is further provided which can be equipped with a screen 11 in the vicinity thereof. The screen can form part of the control panel, for instance if the screen is a so-called touchscreen or the like. This can be used to visualize the operational position of lifting column 1 or even to provide operating options.

Lifting column 1 is preferably used or applied in combination with a number of the same or similar lifting columns 1. These can then lift or lower a vehicle in cooperation by engaging the wheels of such a vehicle with the carriers 7 thereof. Other types of lifting column for lifting other objects can also be equipped with a system according to the present invention, which will be described below with reference to FIGS. 1-5. It is thus possible for boom lifts, scissor lifts, loading platforms etc. to be designed as according to the present invention and to each form a lifting mechanism according to the invention.

Figure 1:
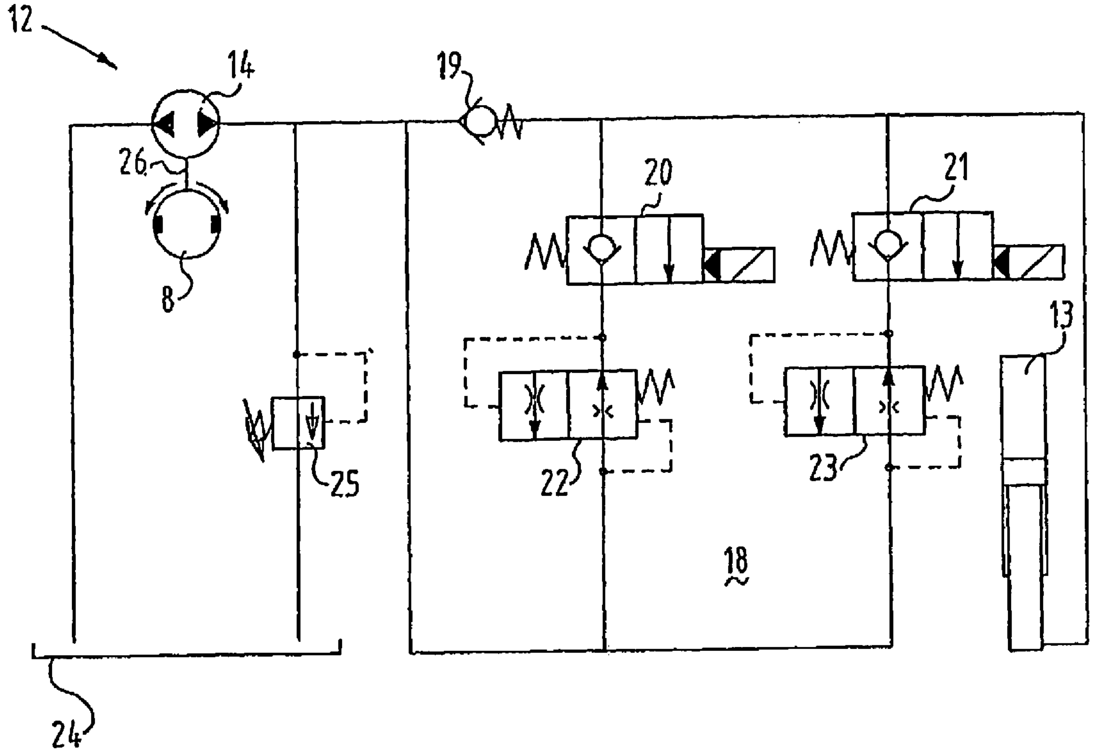
FIG. 1 shows a schematic representation of an electrical part of a system according to the present invention in a first embodiment.

FIG. 1 shows a hydraulic part 12 of a system according to the present invention. A hydraulic cylinder 13 is shown here as embodiment of a hydraulic motor, which can be driven by means of a hydraulic pump 14 connected to hydraulic cylinder 13. Hydraulic pump 14 is coupled to electric motor 8. Electric motor 8 is for instance of the type which functions on a supply voltage of 24 Volts. This supply voltage can be supplied using two batteries 15, 16, each of for instance 12 Volts, which are provided in electrical part 17 according to FIG. 2.

In FIG. 1 a hydraulic system 18 is arranged between hydraulic pump 14 and cylinder 13. This system comprises a non-return valve 19 for passage in one direction of hydraulic fluid displaced in the direction of cylinder 13 by means of pump 14. This takes place during ascent. When the upward movement of cylinder 13 is then ended by interrupting the driving of hydraulic pump 14, a descent valve 20 can be selectively energized in order to feed hydraulic fluid back via associated throttle 22 to a point in the conduit between hydraulic pump 14 and non-return valve 19. Hydraulic fluid can thus be fed back to reservoir 24 via hydraulic pump 14.

The operation of descent valve 20 and a correction valve 21, in combination with associated throttles 22, 23, as well as the control thereof, is described at length in the as yet unpublished Netherlands patent application NL-1 027 870. For the configuration, operation and use of the thus formed hydraulic system 18 explicit reference is made to the disclosure of NL-1 027 870. The same is the case for the configuration, operation and use of a pressure-relief valve 25.

When cylinder 13 moves downward, for instance under the influence of the force of gravity of the load resting on carrier 7 in FIG. 6, hydraulic fluid is displaced out of cylinder 13 to pump 14 via hydraulic system 18. This pump is hereby set into motion, as well as drive shaft 26 of electric motor 8. Electric motor 8 thus also begins to move and thereby comes into operation as generator. Motor 8 therefore also forms a generator for generating electrical energy. At this stage of the descending movement cylinder 13 thus forms a reservoir for the purpose of driving electric motor 8 with hydraulic fluid therefrom, in order to cause the motor to function as generator.

Figure 2:
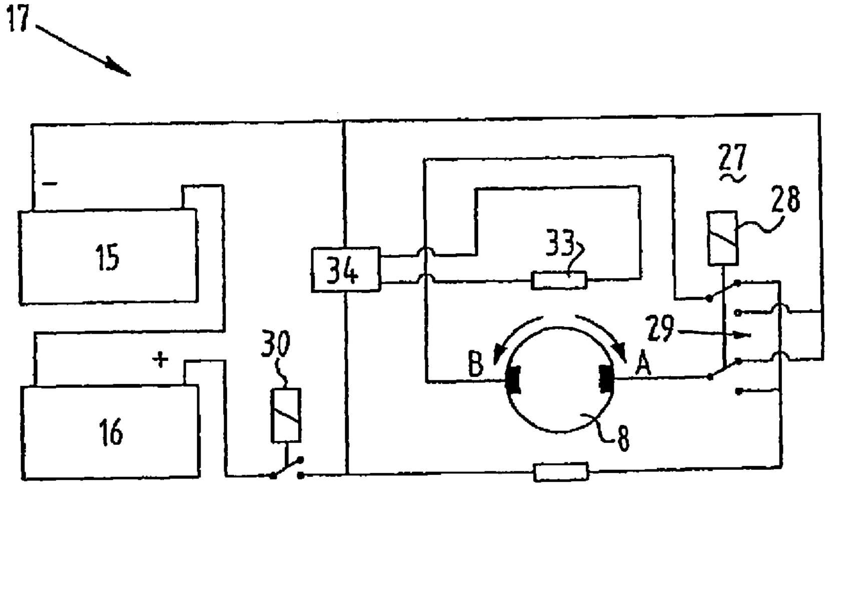
FIG. 2 shows a schematic representation of an electrical part of a system according to the present invention in the first embodiment.

FIG. 2 shows how motor 8 is connected to a power source which is formed by means of the two batteries 15, 16. Use is made for this purpose of a polarity-inverting circuit 27.

The motor, or rather the drive shaft 26 of motor 8, rotates in the direction of arrow A during an ascending movement of carrier 7. Energy from batteries 15, 16 is used here. If the direction of movement of carrier 7 is reversed to a downward movement of carrier 7, hydraulic pump 14 in FIG. 1 will drive motor 8 in opposite direction to arrow B. In order to prevent damage to batteries 15, 16 and enable charging of batteries 15, 16, the polarity-inverting circuit 27 provides for inversion of the connection of motor 8 to batteries 15, 16. Use is made for this purpose of a relay 28, which acts on a dual switch 29 to reverse the connection between electric motor 8 and respectively the positive and negative side of the two batteries 15, 16. The electrical energy coming from and generated by the electric motor is thus supplied to batteries 15, 16 in the correct polarity for charging thereof.

It is noted that the circuit of FIG. 2 also comprises a motor relay 30 for setting electric motor 8 into operation for the purpose of the upward movement of carrier 7. The same motor relay 30 must also be closed for the purpose of charging the batteries 15, 16 with energy from electric motor 8 during a downward movement of carrier 7.

Figure 3:
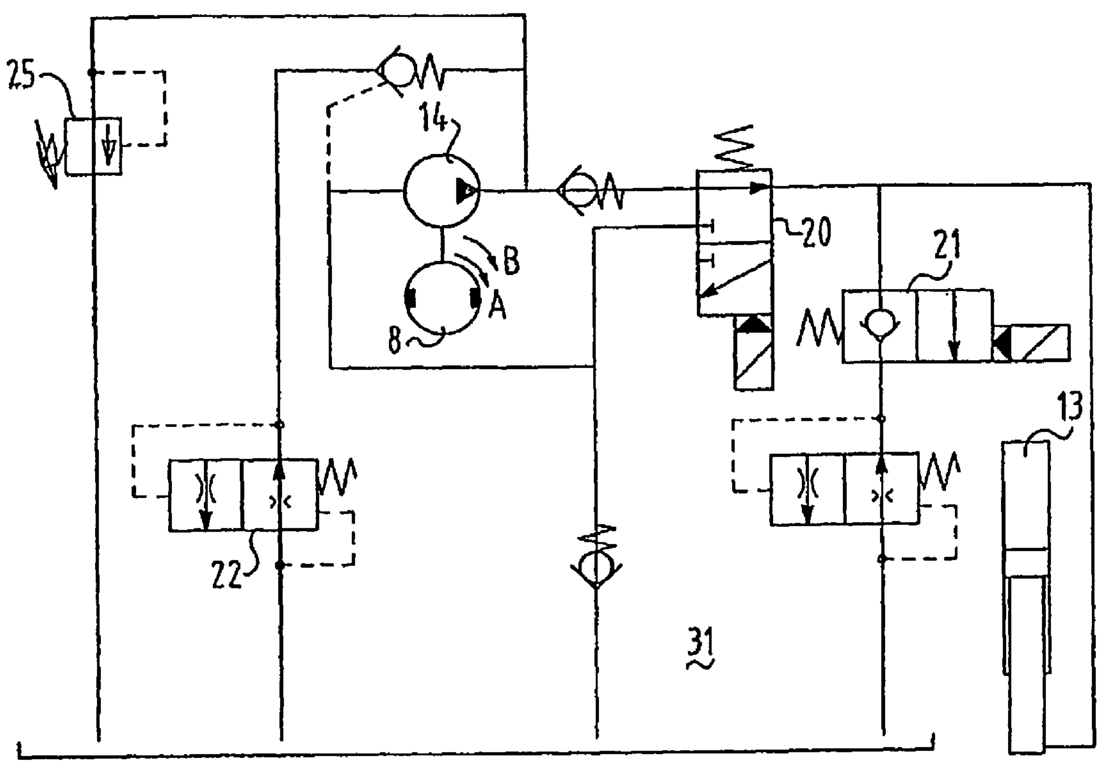
FIG. 3 shows a schematic representation of a hydraulic part of a system according to the present invention in a second embodiment.
Figure 4:
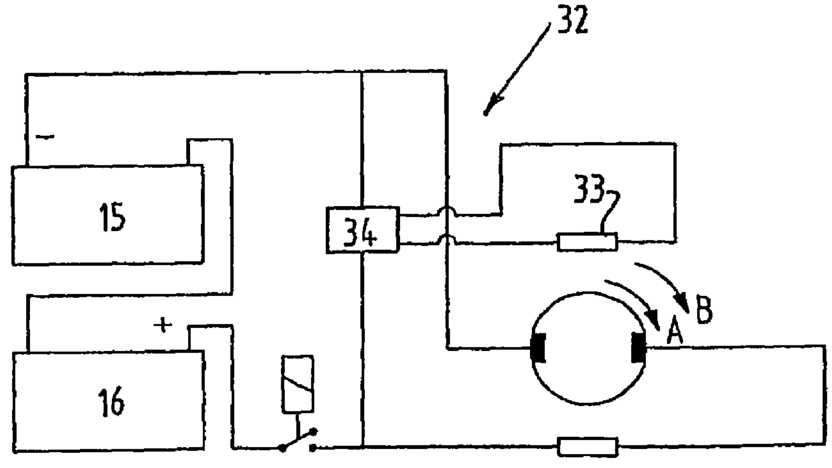
FIG. 4 shows a schematic representation of an electrical part of a system according to the present invention in the second embodiment.

The embodiment of FIGS. 3 and 4 achieves that hydraulic fluid from cylinder 13 is displaced in the same direction through hydraulic pump 14 during the downward movement of carrier 7. Cylinder 13 is herein pressed in. The hydraulic system 31 formed here, with substantially the same components as hydraulic system 18 in FIG. 1, is thus designed differently so as to rotate hydraulic pump 14 and electric motor 8 in the same direction during a downward movement of carrier 7. For this purpose only valve 20 is made double-acting and a different feedback to hydraulic pump 14 is realized.

In electrical part 32 according to FIG. 4, which is associated with the hydraulic part according to FIG. 3, the polarity-inverting circuit 27 can therefore be omitted relative to electrical part 17 according to FIG. 2. There is always only a flow of hydraulic fluid through hydraulic pump 14 in a single direction. Electric motor 8 will thus rotate in the same direction during both an ascending movement and a descending movement of carrier 7, this being indicated in FIGS. 3 and 4 with arrows A and B, which are drawn in the same direction. Because electric motor 8 rotates in the same direction during the descent and ascent of carrier 7 in FIG. 6, electrical energy is supplied to batteries 15, 16 in the same polarity as that in which electric motor 8 can also be driven, but in this case for the purpose of recharging batteries 15, 16.

In the embodiments of electrical parts 17, 32 shown in FIGS. 2 and 4 there is further arranged a shunt 33 which can be controlled by means of a control circuit 34 so as to bring the electrical energy generated by electric motor 8, operating as generator, to a voltage level which is suitable for charging batteries 15, 16.

Figure 5:
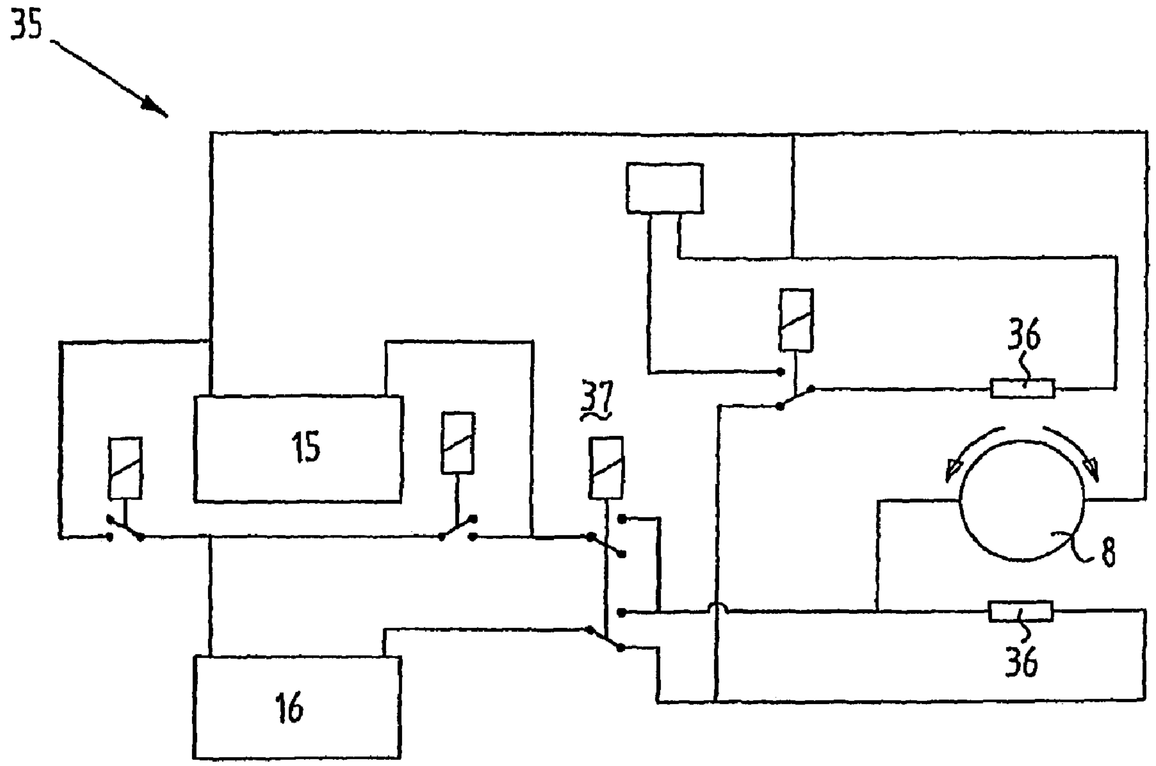
FIG. 5 shows a schematic representation of an alternative for an electrical part in a random embodiment of the present invention.

Use can however also be made for this purpose of a somewhat more complex electrical part 35 as according to FIG. 5. The shunts 33 are herein fixed, but use is made of a serial-parallel circuit between electric motor 8 and the individual batteries 15, 16. In the upward movement of carrier 7 in FIG. 6 the serial-parallel circuit 37 is adjusted such that batteries 15, 16 are incorporated in series in the circuit with electric motor 8. Combined voltage of batteries 15, 16 is thus supplied to electric motor 8. If each of the batteries 15, 16 has a voltage level of 12 Volts, a voltage of 24 Volts is therefore supplied to electric motor 8. When the downward movement of carrier 7 in FIG. 6 is started, the direction of rotation of electric motor 8 can reverse in similar manner as in FIG. 2. The direction of rotation of hydraulic motor 14 and of electric motor 8 can however also remain the same during both operative modes.

Irrespective of the chosen configuration of the hydraulic part according to either FIG. 1 or FIG. 3, the serial-parallel circuit 37 ensures that batteries 15, 16 are connected in a parallel configuration to electric motor 8 in the descending movement of carrier 7. The advantage of this configuration is apparent from the following observations.

In a possible embodiment the unloaded rotation speed of the electric motor can amount to 4200 revolutions per minute. The loaded rotation speed can amount to 2500 revolutions per minute.

In order to allow the electric motor 8 to function as generator, it must be driven at a rotation speed which must exceed the unloaded rotation speed by roughly (as maximum or minimum) the difference between the unloaded rotation speed and the loaded rotation speed. If the difference between the unloaded rotation speed and the loaded rotation speed amounts to (4200-2500)1700 revolutions per minute, the motor then operates as a generator at a rotation speed of about 5900 revolutions per minute. However, the operative mode as generator already begins at a lower rotation speed, for instance the unloaded rotation speed. It will be apparent that, in order to allow the motor to function as generator, the rotation speed of the motor in the operative mode as generator must/be almost or at least roughly twice as high as the loaded rotation speed in order to be able to obtain an effective output of electrical energy. This should mean that the descending movement must be approximately twice as fast as the ascending movement. This is however deemed to be too fast. The descent speed must normally be about the same as the ascent speed. In such a configuration the system according to the invention is generally deemed to be normal and safe.

However, by connecting the batteries in parallel during the descending movement of carrier 7, the required rotation speed of the motor functioning as generator is halved, and will lie between 2100 and 2950 revolutions per minute. Under the above assumption that the loaded rotation speed of motor 8 is about 2500 revolutions per minute during ascent of carrier 7, carrier 7 will have approximately the same speed as during ascent, although in opposite direction, during a descending movement corresponding with said rotation speeds during descent.

A descent speed which is acceptable and deemed safe is thus realized in simple manner and with limited means and investment. The motor 8 functioning as generator herein also generates a voltage which is sufficient for the effective recharging or charging of batteries 15, 16, this being made possible by the parallel connection thereof to the electric motor with a corresponding adjustment of serial-parallel circuit 37.

Many alternative and additional embodiments of the present invention will occur to the skilled person after examination of the foregoing, which must however all be deemed as lying within the scope of the present claims, irrespective of whether they are embodiments which are specifically described here in the foregoing description and/or are shown in the accompanying figures. It is for instance possible to provide a configuration in which two hydraulic pumps 14 are connected to a single (drive shaft 26 of) electric motor 8. The two hydraulic pumps 14 then supply hydraulic fluid to cylinder 13 during an upward movement of carrier 7. If the operative mode is reversed and carrier 7 must descend, one of the two hydraulic pumps 14 can be uncoupled from (drive shaft 26 of) electric motor 8. The same volume of hydraulic fluid, coming from cylinder 13, will thus be pressed through the single hydraulic pump in a downward movement of carrier 7, wherein the other hydraulic pump is uncoupled, so as to produce an approximately twice as high rotation speed of hydraulic pump 14, and therefore also of electric motor 8. In such a configuration it is also realized with certainty that batteries 15, 16 or a single battery (not shown) can be charged for a higher operating voltage of electric motor 8.

A direct current motor, for instance a linear direct current motor, is further shown in the drawings, while motors based on permanent magnets, or even other electrical machines, can likewise be used within the scope of the present invention; all of these are designated as electric motor according to the claims.

The power sources for charging thereof can also be connected selectively to the mains supply. Other sources for charging, such as solar panels etc., can also be used to make the system according to the invention as autonomous as possible, i.e. as independent as possible from the mains supply, and, preferably fully autonomous.

The invention claimed is:

1. A system for lifting and lowering a load, with at least one lifting mechanism, which lifting mechanism comprises:

a carrier which can be moved up and downward for bearing the load; and a drive which acts on the carrier, wherein the drive comprises at least one electrical power source and an electric motor to be energized at least during ascending of the carrier, and the electric motor forms a generator to be connected to the power source at least during even an unloaded descending movement of the carrier for the purpose of generating electrical energy to the power source, wherein the power source comprises at least two sub-sources that are direct voltage sources and the sub-sources are connected to the generator via a serial-parallel circuit, and the serial-parallel circuit connects the sub-sources in series during an upward movement of the carrier and connects the sub-sources in parallel during a downward movement.

2. The system as claimed in claim 1, wherein the power source comprises a direct current source, and a selective polarity-inverting circuit is arranged between the power source and the generator.

3. The system as claimed in claim 2, wherein the selective polarity-inverting circuit is adapted to invert the polarity of the connection between the power source and the electric motor at a change-over between upward and downward movements of the carrier.

4. The system as claimed in claim 1, wherein the drive further comprises a hydraulic pump coupled to the electric motor and a hydraulic motor, connected to the pump.

5. The system as claimed in claim 4, wherein the hydraulic pump is reversible.

6. The system as claimed in claim 4, wherein a hydraulic circuit is provided between the hydraulic pump and the hydraulic motor for selectively reversing the flow direction of hydraulic fluid through the hydraulic pump.

7. The system as claimed in claim 4, wherein the hydraulic circuit is adapted to reverse the flow direction of hydraulic fluid at a change-over between upward and downward movements of the carrier.

8. The system as claimed in claim 1, wherein the lifting mechanism is a mobile lifting column.

* * * * *